United States Patent [19]

Usami et al.

[11] Patent Number: 5,142,356
[45] Date of Patent: Aug. 25, 1992

[54] COLOR IMAGE READING APPARATUS OR COLOR IMAGE FORMING APPARATUS CAPABLE OF PERFORMING COLOR ADJUSTMENT

[75] Inventors: Akihiro Usami; Hisashi Fukushima, both of Yokohama, Japan

[73] Assignee: Canon Kabushiki Kaisha, Tokyo, Japan

[21] Appl. No.: 789,450

[22] Filed: Nov. 7, 1991

Related U.S. Application Data

[63] Continuation of Ser. No. 425,443, Oct. 23, 1989, abandoned, which is a continuation of Ser. No. 113,235, Oct. 27, 1987, abandoned.

[30] Foreign Application Priority Data

| Oct. 29, 1986 | [JP] | Japan | 61-258950 |
| Jan. 27, 1987 | [JP] | Japan | 62-15121 |
| Jan. 27, 1987 | [JP] | Japan | 62-15128 |
| Jan. 27, 1987 | [JP] | Japan | 62-15131 |
| Jan. 28, 1987 | [JP] | Japan | 62-16214 |

[51] Int. Cl.⁵ .................................. H04N 1/46
[52] U.S. Cl. .................................. 358/80; 358/75
[58] Field of Search ............... 358/75, 80, 404, 406

[56] References Cited

U.S. PATENT DOCUMENTS

| 3,612,753 | 10/1971 | Korman | 358/80 |
| 4,037,249 | 7/1977 | Pugsley | 358/80 |
| 4,075,662 | 2/1978 | Gall | 358/80 |
| 4,481,532 | 11/1984 | Clark et al. | 358/80 |
| 4,626,903 | 12/1986 | Giesche et al. | 358/80 |
| 4,631,578 | 12/1986 | Sasaki et al. | 358/80 |
| 4,672,432 | 6/1987 | Sakurada et al. | 358/80 |
| 4,679,074 | 7/1987 | Sugiura et al. | 358/80 |
| 4,683,492 | 7/1987 | Sugiura et al. | 358/80 |
| 4,734,762 | 3/1988 | Aoki et al. | 358/80 |
| 4,739,397 | 9/1988 | Hayashi | 358/80 |
| 4,745,466 | 5/1988 | Yoshida et al. | 358/80 |
| 4,847,654 | 7/1989 | Honma et al. | 358/300 |
| 4,864,391 | 9/1989 | Taguchi | 358/80 |

FOREIGN PATENT DOCUMENTS

| 0144188 | 6/1985 | European Pat. Off. | 358/80 |
| 57-54473 | 3/1982 | Japan | 358/75 IJ |
| 59-171289 | 9/1984 | Japan | 358/80 |
| 60-220659 | 11/1985 | Japan | 358/80 |
| 652578 | 3/1979 | U.S.S.R. | 358/75 |

Primary Examiner—James J. Groody
Assistant Examiner—Mark R. Powell
Attorney, Agent, or Firm—Fitzpatrick, Cella, Harper & Scinto

[57] ABSTRACT

A color copying machine includes a reading unit for reading a color original, a correction unit for performing color correction processing of a color image signal read by the reading unit, an image forming unit for forming a color image based on a correction output from the correction unit, and a setting unit for setting a correction characteristic of the color correction processing based on the color image signal read by the reading unit. The color copying machine is thereby able to compensate for differences in and/or changes of the color characteristics of the reading unit or the image forming unit.

15 Claims, 16 Drawing Sheets

FIG. 14

| NO | Y | M | C | Bk | NO | Y | M | C | Bk | NO | Y | M | C | Bk | NO | Y | M | C | Bk |
|---|---|---|---|---|---|---|---|---|---|---|---|---|---|---|---|---|---|---|---|
| 0 | 0 | 0 | 0 | 0 | 16 | 0 | 0 | 1 | 0 | 32 | 0 | 0 | 2 | 0 | 48 | 0 | 0 | 3 | 0 |
| 1 | 1 | 0 | 0 | 0 | 17 | 1 | 0 | 1 | 0 | 33 | 1 | 0 | 2 | 0 | 49 | 1 | 0 | 3 | 0 |
| 2 | 2 | 0 | 0 | 0 | 18 | 2 | 0 | 1 | 0 | 34 | 2 | 0 | 2 | 0 | 50 | 2 | 0 | 3 | 0 |
| 3 | 3 | 0 | 0 | 0 | 19 | 3 | 0 | 1 | 0 | 35 | 3 | 0 | 2 | 0 | 51 | 3 | 0 | 3 | 0 |
| 4 | 0 | 1 | 0 | 0 | 20 | 0 | 1 | 1 | 0 | 36 | 0 | 1 | 2 | 0 | 52 | 0 | 1 | 3 | 0 |
| 5 | 1 | 1 | 0 | 0 | 21 | 1 | 1 | 1 | 0 | 37 | 1 | 1 | 2 | 0 | 53 | 1 | 1 | 3 | 0 |
| 6 | 2 | 1 | 0 | 0 | 22 | 2 | 1 | 1 | 0 | 38 | 2 | 1 | 2 | 0 | 54 | 2 | 1 | 3 | 0 |
| 7 | 3 | 1 | 0 | 0 | 23 | 3 | 1 | 1 | 0 | 39 | 3 | 1 | 2 | 0 | 55 | 3 | 1 | 3 | 0 |
| 8 | 0 | 2 | 0 | 0 | 24 | 0 | 2 | 1 | 0 | 40 | 0 | 2 | 2 | 2 | 56 | 0 | 2 | 3 | 2 |
| 9 | 1 | 2 | 0 | 0 | 25 | 1 | 2 | 1 | 0 | 41 | 1 | 2 | 2 | 2 | 57 | 1 | 2 | 3 | 2 |
| 10 | 2 | 2 | 0 | 0 | 26 | 2 | 2 | 1 | 0 | 42 | 2 | 2 | 2 | 2 | 58 | 2 | 2 | 3 | 2 |
| 11 | 3 | 2 | 0 | 0 | 27 | 3 | 2 | 1 | 0 | 43 | 3 | 2 | 2 | 2 | 59 | 3 | 2 | 3 | 2 |
| 12 | 0 | 3 | 0 | 0 | 28 | 0 | 3 | 1 | 0 | 44 | 0 | 3 | 2 | 2 | 60 | 0 | 3 | 3 | 3 |
| 13 | 1 | 3 | 0 | 0 | 29 | 1 | 3 | 1 | 0 | 45 | 1 | 3 | 2 | 2 | 61 | 1 | 3 | 3 | 3 |
| 14 | 2 | 3 | 0 | 0 | 30 | 2 | 3 | 1 | 0 | 46 | 2 | 3 | 2 | 2 | 62 | 2 | 3 | 3 | 3 |
| 15 | 3 | 3 | 0 | 0 | 31 | 3 | 3 | 1 | 0 | 47 | 3 | 3 | 2 | 2 | 63 | 3 | 3 | 3 | 3 |

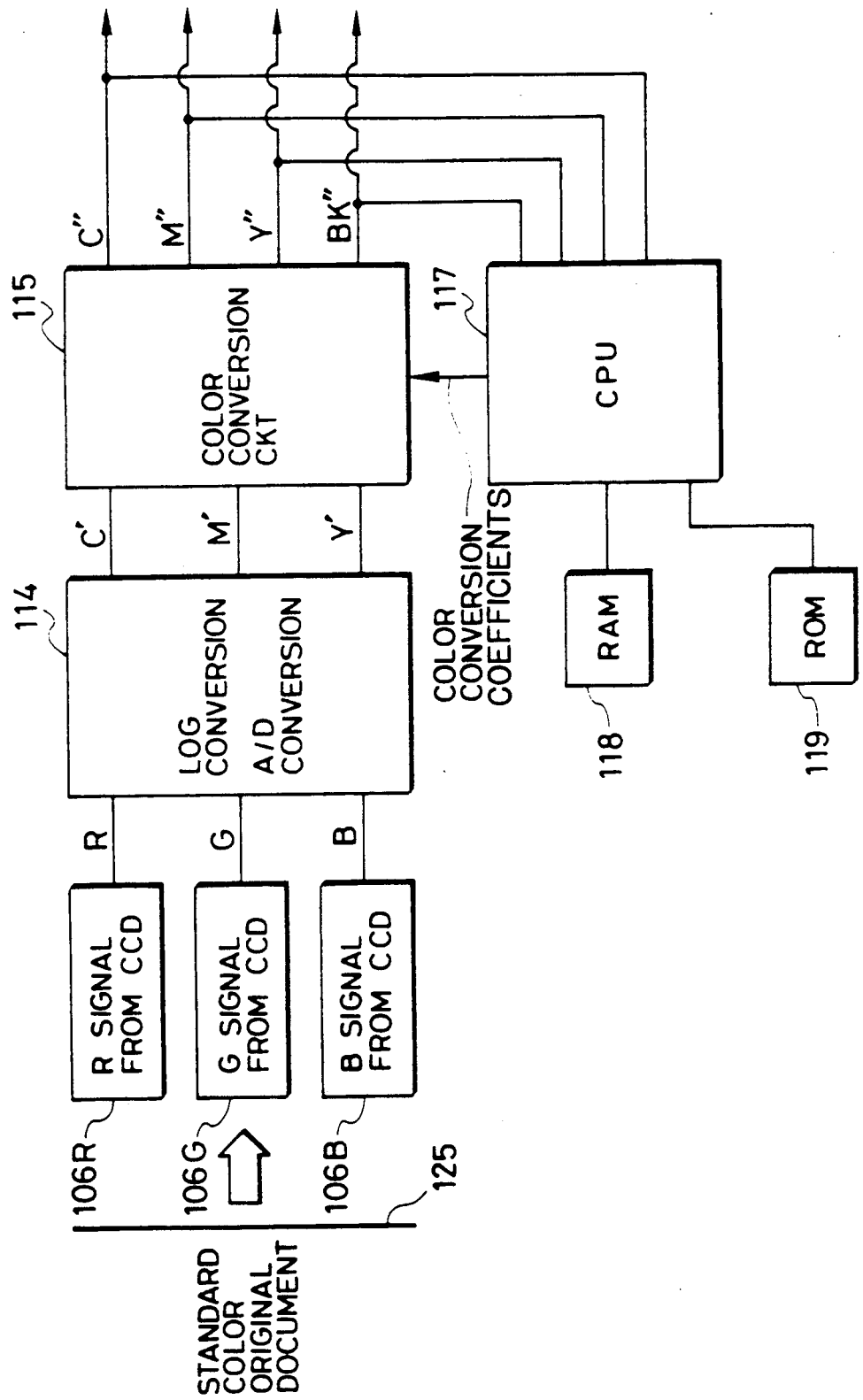

FIG. 21

| NO | Y | M | C | Bk | NO | Y | M | C | Bk | NO | Y | M | C | Bk | NO | Y | M | C | Bk |
|---|---|---|---|---|---|---|---|---|---|---|---|---|---|---|---|---|---|---|---|
| 0 | 0 | 0 | 0 | 0 | 16 | 0 | 0 | 1 | 0 | 32 | 0 | 0 | 2 | 0 | 48 | 0 | 0 | 3 | 0 |
| 1 | 1 | 0 | 0 | 0 | 17 | 1 | 0 | 1 | 0 | 33 | 1 | 0 | 2 | 0 | 49 | 1 | 0 | 3 | 0 |
| 2 | 2 | 0 | 0 | 0 | 18 | 2 | 0 | 1 | 0 | 34 | 2 | 0 | 2 | 0 | 50 | 2 | 0 | 3 | 0 |
| 3 | 3 | 0 | 0 | 0 | 19 | 3 | 0 | 1 | 0 | 35 | 3 | 0 | 2 | 0 | 51 | 3 | 0 | 3 | 0 |
| 4 | 0 | 1 | 0 | 0 | 20 | 0 | 1 | 1 | 0 | 36 | 0 | 1 | 2 | 0 | 52 | 0 | 1 | 3 | 0 |
| 5 | 1 | 1 | 0 | 0 | 21 | 1 | 1 | 1 | 0 | 37 | 1 | 1 | 2 | 0 | 53 | 1 | 1 | 3 | 0 |
| 6 | 2 | 1 | 0 | 0 | 22 | 2 | 1 | 1 | 0 | 38 | 2 | 1 | 2 | 0 | 54 | 2 | 1 | 3 | 0 |
| 7 | 3 | 1 | 0 | 0 | 23 | 3 | 1 | 1 | 0 | 39 | 3 | 1 | 2 | 0 | 55 | 3 | 1 | 3 | 0 |
| 8 | 0 | 2 | 0 | 0 | 24 | 0 | 2 | 1 | 0 | 40 | 0 | 2 | 2 | 2 | 56 | 0 | 2 | 3 | 2 |
| 9 | 1 | 2 | 0 | 0 | 25 | 1 | 2 | 1 | 0 | 41 | 1 | 2 | 2 | 2 | 57 | 1 | 2 | 3 | 2 |
| 10 | 2 | 2 | 0 | 0 | 26 | 2 | 2 | 1 | 0 | 42 | 2 | 2 | 2 | 0 | 58 | 2 | 2 | 3 | 0 |
| 11 | 3 | 2 | 0 | 0 | 27 | 3 | 2 | 1 | 0 | 43 | 3 | 2 | 2 | 0 | 59 | 3 | 2 | 3 | 0 |
| 12 | 0 | 3 | 0 | 0 | 28 | 0 | 3 | 1 | 0 | 44 | 0 | 3 | 2 | 2 | 60 | 0 | 3 | 3 | 2 |
| 13 | 1 | 3 | 0 | 0 | 29 | 1 | 3 | 1 | 0 | 45 | 1 | 3 | 2 | 0 | 61 | 1 | 3 | 3 | 0 |
| 14 | 2 | 3 | 0 | 0 | 30 | 2 | 3 | 1 | 0 | 46 | 2 | 3 | 2 | 2 | 62 | 2 | 3 | 3 | 2 |
| 15 | 3 | 3 | 0 | 0 | 31 | 3 | 3 | 1 | 0 | 47 | 3 | 3 | 2 | 2 | 63 | 3 | 3 | 3 | 3 |

COLOR IMAGE READING APPARATUS OR COLOR IMAGE FORMING APPARATUS CAPABLE OF PERFORMING COLOR ADJUSTMENT

This application is a continuation-in-part continuation of application Ser. No. 07/425,443 filed Oct. 23, 1989 which is a continuation of application Ser. No. 07/113,235 filed on Oct. 27, 1987, both now abandoned.

BACKGROUND OF THE INVENTION

Field of the Invention.

The present invention relates to a color image reading apparatus or a color image forming apparatus, and more particularly to a color image reading apparatus or a color image forming apparatus capable of performing color adjustment.

A conventional digital color copying machine has an electrical processing system as shown in FIG. 2. An original 1 is read with a solid state image pickup device 6. The R, G and B read-out signals undergo logarithmic conversion by a logarithmic converter 15 to obtain Y (yellow), M (magenta) and C (cyan) print output signals after being subjected to a masking process by a primary converter 16. The obtained signals are used for controlling the quantity of color toner or ink to produce a copy of the original. It is difficult for a printer of the color copying machine to obtain a high fidelity reproduction signal from a color signal (stimulus value) of the original. The reason for this is as follows:

The primary objective of copying is to have a copy 21 of a same color as that of the original 1, namely to satisfy the condition of color matching of $X \equiv X'$, $Y \equiv Y'$ and $Z \equiv Z'$ wherein X', Y' and Z' represent tristimulus values of a copy and X, Y and Z represent tristimulus values of an original. To this end, it is essential for the characteristic of a reading system to follow the principle of a chromaticity meter.

Assuming that the characteristic of a printer is defined by a conversion function f from input signals (Y, M and C) into copied tristimulus values (X' Y' and Z'), a total conversion h x g by a color processing system 15 and 16 having a conversion factor h and a reading system having a conversion factor g should have an inverse conversion function $f^{-1}$. However, the function $f^{-1}$ is non-linear and complicated so that such conversion is hard to be implemented with electronic circuits. In view of this, a simplified and approximate circuit composed of a logarithmic converter 15 and a primary converter 16 is used in practice.

Therefore, it has been difficult to have a copy of exactly the same color as that of an original 1.

Specifically, in case that a change in time occurs of the brightness of an original illuminating lamp, the spectral sensitivity of a photoelectric color conversion element array, or the gain of an amplifier used for digitalizing an image signal, it is impossible to obtain a high fidelity reproduction signal of a color original if color correction is conducted in accordance with predetermined color conversion coefficients.

As a color image forming apparatus, there are known a heat sensitive color transfer printer, an ink-jet color printer, a laser beam color printer, a display unit such as a CRT and the like. Since each apparatus has a different color reproduction characteristic, it become necessary to perform color readjustment when one apparatus is replaced by another apparatus. Namely, since the color reproduction characteristic of an output unit connected to a color image reading apparatus differs from each other and hence has a different optimum setting value for color adjustment, it has been necessary to perform cumbersome color adjustment.

For such a color change, it is difficult for a layman to conduct a color balance adjustment, conventionally, in order to check the characteristic of a printer, a gradation pattern with different color densities generated by a pattern generator has been visually checked. In this case, however, a user other than a color adjustment expert cannot properly perform color adjustment when the color of an original is reproduced quite differently.

As described above, conventional apparatuses pose a problem that a high fidelity color reproduction cannot be obtained due to a different characteristic of a unit in the apparatus and a change in time of the characteristic.

SUMMARY OF THE INVENTION

In view of the above-mentioned disadvantages of the prior art, it is therefore an object of the present invention to provide a color image reading apparatus or a color image forming apparatus capable of performing high fidelity, color reproduction.

According to one aspect of the present invention, it is an object of the present invention to provide a color image reading apparatus wherein in order to compensate for a difference of and/or change in the characteristic of the color image reading apparatus, a color correction circuit is controlled such that a readout value of a predetermined color has a predetermined value.

According to another aspect of the present invention it is an object of the present invention to provide a color image forming apparatus wherein in order to compensate for a difference of and/or change in the color reproduction characteristic of the color image forming apparatus, a color correction circuit is controlled such that a color image formed by using predetermined values has a predetermined color balance.

According to a further aspect of the present invention, it is an object of the present invention to provide a color copying machine wherein in order to compensate for a difference of and/or change in the characteristics of the color image reading unit and a color image forming unit, a color correction circuit is controlled such that a color image formed by using predetermined values and read by the color image reading unit has a predetermined value.

According to a further aspect of the present invention, is an object of the present invention to provide a color image forming apparatus wherein a color image is formed by using predetermined values, the relation between the read-out value of the color image and an ideal value is discriminated from each other, and the discrimination result is displayed.

The above and other objects of the present invention will become apparent from the following detailed description when read in conjunction with the accompanying drawings

BRIEF DESCRIPTION OF THE DRAWINGS

FIG. 14 shows Y, M, C and Bk target values obtained by reading a standard color original;

FIG. 18 is a block diagram of a color image reading apparatus according to a fourth embodiment of the present invention;

FIG. 21 illustrates the color pattern information table of the fifth embodiment;

DETAILED DESCRIPTION OF THE PREFERRED EMBODIMENTS

A color image reading system will first be described.

Figure 6:
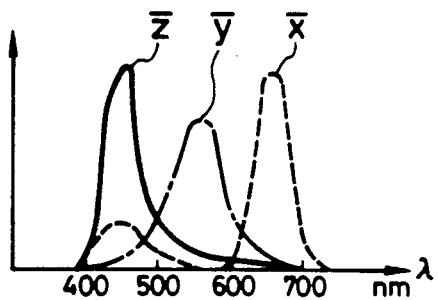
FIG. 6 shows the spectral characteristic of a color matching function.

Discriminating colors of an original is just the same as reading signals in conformity with the characteristic of human eye. In this case, a color matching function (two degrees visual field, four degrees visual field defined by CIE and JIS) as shown in FIG. 6 is used basically. In measuring a color of an object (in this case, an original), a color evaluation light source(C light source and $D_{65}$ light source are preferable as defined by CIE and JIS) for illuminating an object when observed by a person plays an important role. A color matching function multiplied by an energy distribution of a color evaluation light source for each color is called a multiple value coefficient. Thus, it is desirable to match the image pickup characteristic of a color image reading apparatus with the spectral distribution of a color matching function or a multiple value coefficient. This condition is called a Luther condition.

However, it is difficult and not practical to obtain an optimum combination of presently available various light sources, filters and photoelectric conversion elements while taking their spectral characteristics into consideration.

Figure 5A:
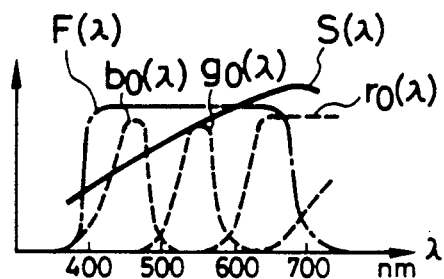
FIGS. 5A and 5B show the spectral characteristics of an image pickup system.
Figure 5B:
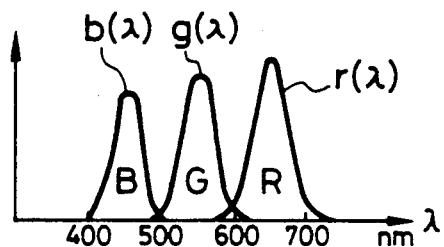

The image pickup characteristics $r(\lambda)$, $g(\lambda)$ and $b(\lambda)$ shown in FIG. 5B each are obtained through multiplication of a light source $S(\lambda)$ indicated by a solid line in FIG. 5A, a transmissivity $F(\lambda)$ of, e.g., a glass filter indicated by a one-dot chain line in FIG. 5A and each of spectral sensitivities $r_0(\lambda)$, $g_0(\lambda)$ and $b_0(\lambda)$ (inclusive of a transmissivity of R, G or B color separation filter) of a solid state image pickup element indicated by a broken line in FIG. 5A, wherein $\lambda$ represents a wavelength. Namely:

$$r(\lambda) = S(\lambda) \cdot F(\lambda) \cdot r_0(\lambda)$$

$$g(\lambda) = S(\lambda) \cdot F(\lambda) \cdot g_0(\lambda)$$

$$b(\lambda) = S(\lambda) \cdot F(\lambda) \cdot b_0(\lambda)$$

Therefore, the primary conversion coefficients for color correction can be obtained if the image pickup characteristics $r(\lambda)$, $g(\lambda)$ and $b(\lambda)$ are given by the primary conversion of the color matching function $\bar{x}(\lambda)$, $\bar{y}(\lambda)$ and $\bar{z}(\lambda)$, or the multiple value coefficients $\rho(\lambda) \times \bar{x}(\lambda)$, $\rho(\lambda) \times \bar{y}(\lambda)$ and $\pi(\lambda) \times \bar{z}(\lambda)$, wherein $\rho(\lambda)$ is for a color evaluation light source, e.g., C light source or $D_{65}$ light source.

The primary conversion coefficients are obtained as in the following, wherein only the multiple value coefficients are illustrated for the purpose of avoiding a duplication of description.

Primary conversion of the multiple value coefficients can be expressed by the following ideal equation:

$$\begin{bmatrix} \rho(\lambda) \cdot x(\lambda) \\ \rho(\lambda) \cdot y(\lambda) \\ \rho(\lambda) \cdot z(\lambda) \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} r(\lambda) \\ g(\lambda) \\ b(\lambda) \end{bmatrix}$$

Since the above equation is hard to be fully satisfied, the primary conversion coefficients $a_{ij}$ are determined in practice so as to approximately satisfy the equation.

A first embodiment of the present invention will be described in particular.

Figure 4:
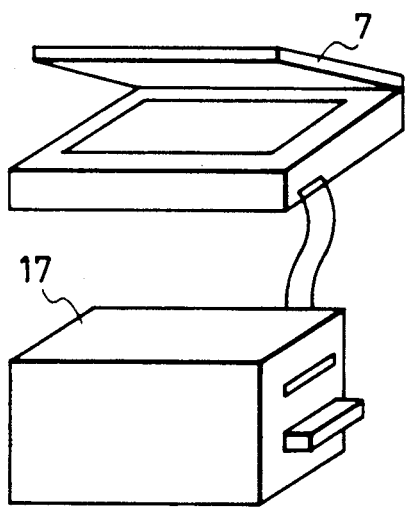
FIG. 4 is a perspective view of a color copying machine.

In the perspective view of a color copying machine of the first embodiment shown in FIG. 4, reference number 7 denotes a color original reading apparatus, and a reference number 17 denotes a color printer.

Figure 3:
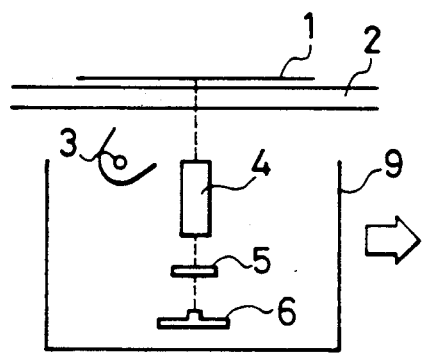
FIG. 3 is a partial view in section of a color original reading apparatus.

FIG. 3 is a sectional view showing a part of the color original reading apparatus 7.

An original 1 placed on an original support glass 2 is applied with light by an original illuminating system 3 (lamp, reflective shade). The image of the illuminated original 1 is focussed on a solid state color image pickup element array 6 by an image focussing element array 4 via an infrared cut filter 5. For scanning the original, the entirety of the optical system 9 is moved in the direction indicated by an arrow in FIG. 3.

Figure 7A:
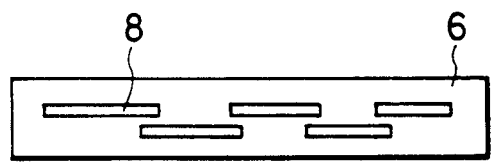
FIG. 7A is a top view of a solid state image pickup element.
Figure 7B:
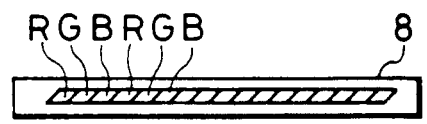
FIG. 7B is an enlarged view showing a part of the element of FIG. 7A.

The solid state color image pickup element 6 is composed of a plurality of chips disposed in a zig-zag configuration as shown in FIG. 7A. As shown in FIG. 7B, each chip 8 has a plurality of photoelectric conversion elements and a set of R, G and B filters are sequentially disposed in this order for each pixel thereof. Charges stored in each pixel are serially transferred to an external circuit via a shift register upon reception of an appropriate clock signal. The transferred serial signal is separated into and picked up as three R, G and B pixel signals at latch timings.

Next, a detailed description of a color image signal processing will be given.

Figure 1:
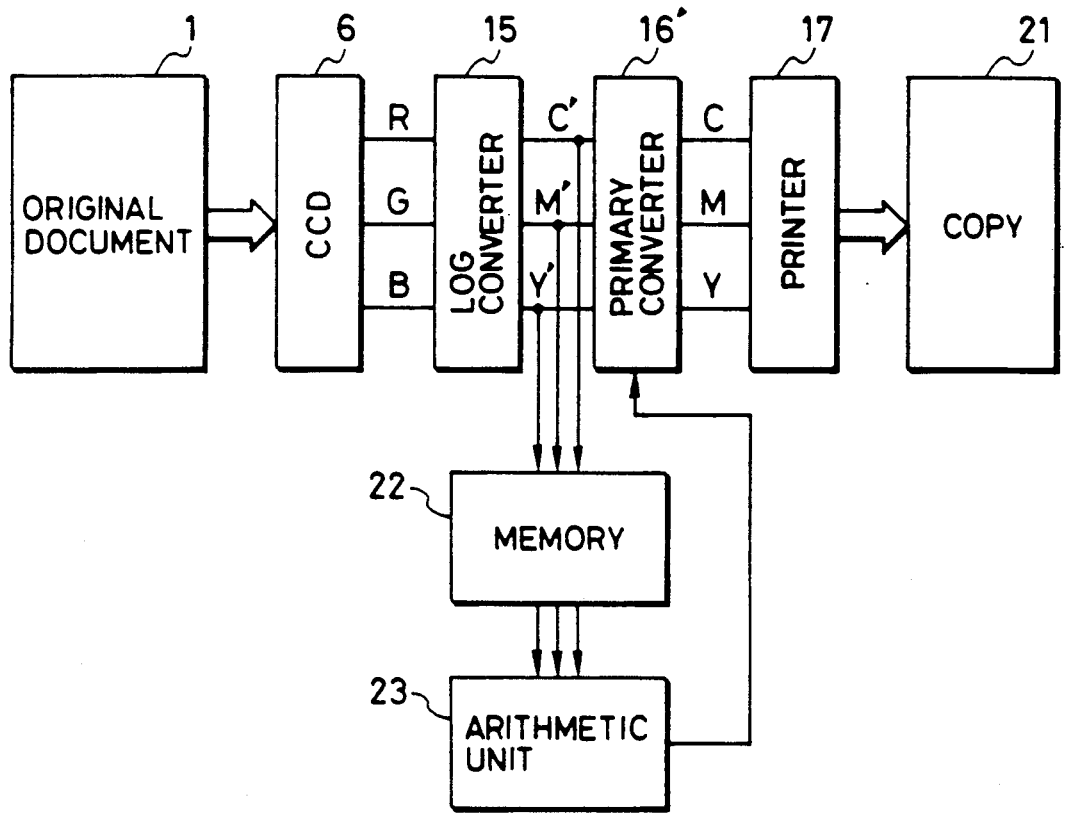
FIG. 1 is a control block diagram showing an embodiment according to the present invention.
Figure 2:
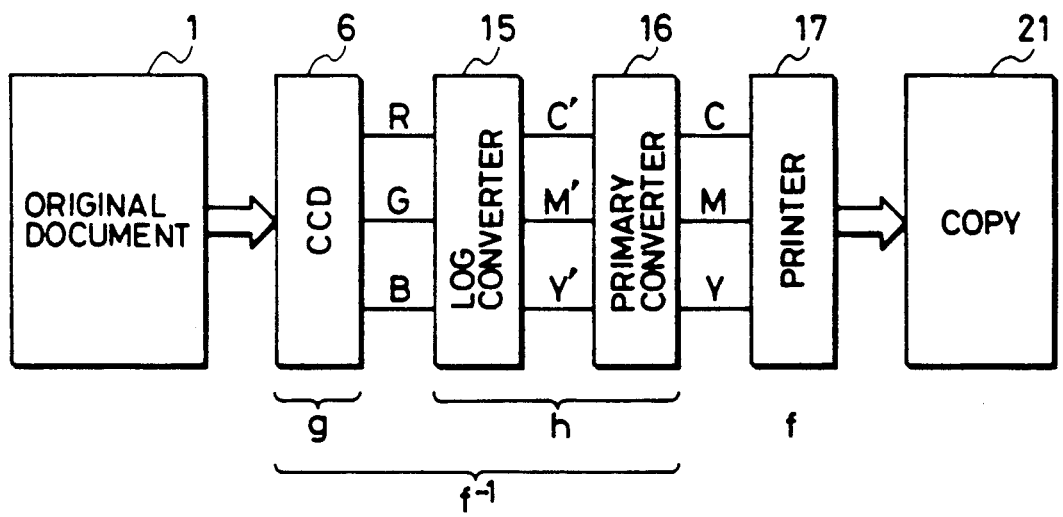
FIG. 2 is a conventional control block diagram.

Elements in FIG. 1 having a similar function to that shown in FIG. 2 have been designated by using identical references.

Prior to an actual copying process, an adjustment process is carried out. A standard original 1 recorded with a plurality of standard colors is scanned with the optical system 9 shown in FIG. 3 in the direction indicated by an arrow. At this adjustment process, signals are sampled at appropriate sampling timings to be stored in a memory 22 as Cl', Ml' and Yl', wherein l represents the number of sampling data, i.e., the number of standard color of the original. After the optical system 9 shown in FIG. 3 has completed to scan the original and is returned to its home position, an arithmetic unit 23 performs the following operation prior to the start of an actual copying process:

Through the arithmetic operation between the readout signals $C_l'$, $M_l'$ and $Y_l'$ and the predetermined signals $C_l$, $M_l$ and $Y_l$ satisfying the condition of color matching, the color correction coefficients $b_{ij}$ for a primary converter 16' are obtained, wherein l represents the number of sampling point.

$$\begin{bmatrix} C_l' \\ M_l' \\ Y_l' \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} C_l \\ M_l \\ Y_l \end{bmatrix}$$

The above equation does not satisfy $C_l'' = C_l$, $M_l'' = M$ and $Y_l'' = Y$ so that the coefficients are determined using the following method of least squares: First the evaluation functions are determined as expressed by $$\phi_C = \sum_l \{C_l - (b_{11}C_l' + b_{12}M_l' + b_{13}Y_l')\}^2$$

$$\phi_M = \sum_l \{M_l - (b_{21}C_l' + b_{22}M_l' + b_{23}Y_l')\}^2$$

$$\phi_Y = \sum_l \{Y_l - (b_{31}C_l' + b_{32}M_l' + b_{33}Y_l')\}^2$$

and coefficients are obtained through partial differentiation with respect to each parameter $b_{ij}$. An example of obtaining $b_{11}$, $b_{12}$ and $b_{13}$ is:

$$\begin{cases} \frac{\partial \phi_c}{\partial b_{11}} = 2\sum_l \{C_l - (b_{11}C_l' + b_{12}M_l' + b_{13}Y_l')\}(-C_l') = 0 \\ \frac{\partial \phi_c}{\partial b_{12}} = 2\sum_l \{C_l - (b_{11}C_l' + b_{12}M_l' + b_{13}Y_l')\}(-M_l') = 0 \\ \frac{\partial \phi_c}{\partial b_{13}} = 2\sum_l \{C_l - (b_{11}C_l' + b_{12}M_l' + b_{13}Y_l')\}(-Y_l') = 0 \end{cases}$$

The coefficients $b_{11}$, $b_{12}$ and $b_{13}$ are obtained by solving the above equations. Similarly, the equations with respect to $\phi_M$ and $\phi_Y$ are calculated to obtain all of the $b_{ij}$.

The coefficients thus obtained are used as the primary conversion coefficients for the primary converter 16' to carry out an actual copying operation.

With the above method, it becomes possible to obtain a high fidelity reproduction of an original without manual color adjustment for each different original.

A microcomputer may be used as the arithmetic unit 23.

A second embodiment of the present invention will be described.

In the second embodiment, a plurality of points in a standard original are designated by using a digitizer, and the above-described arithmetic operation is conducted for the designated points to obtain color correction coefficients.

Since various colors can be designated by the digitizer, the color correction coefficients can be obtained more precisely.

Figure 8A:
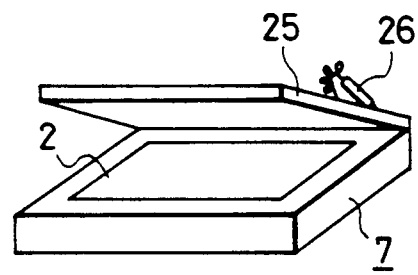
FIGS. 8A and 8B are perspective views of a digitizer.
Figure 8B:
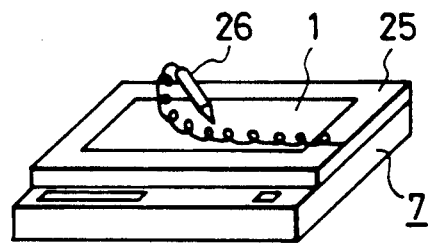
Figure 9:
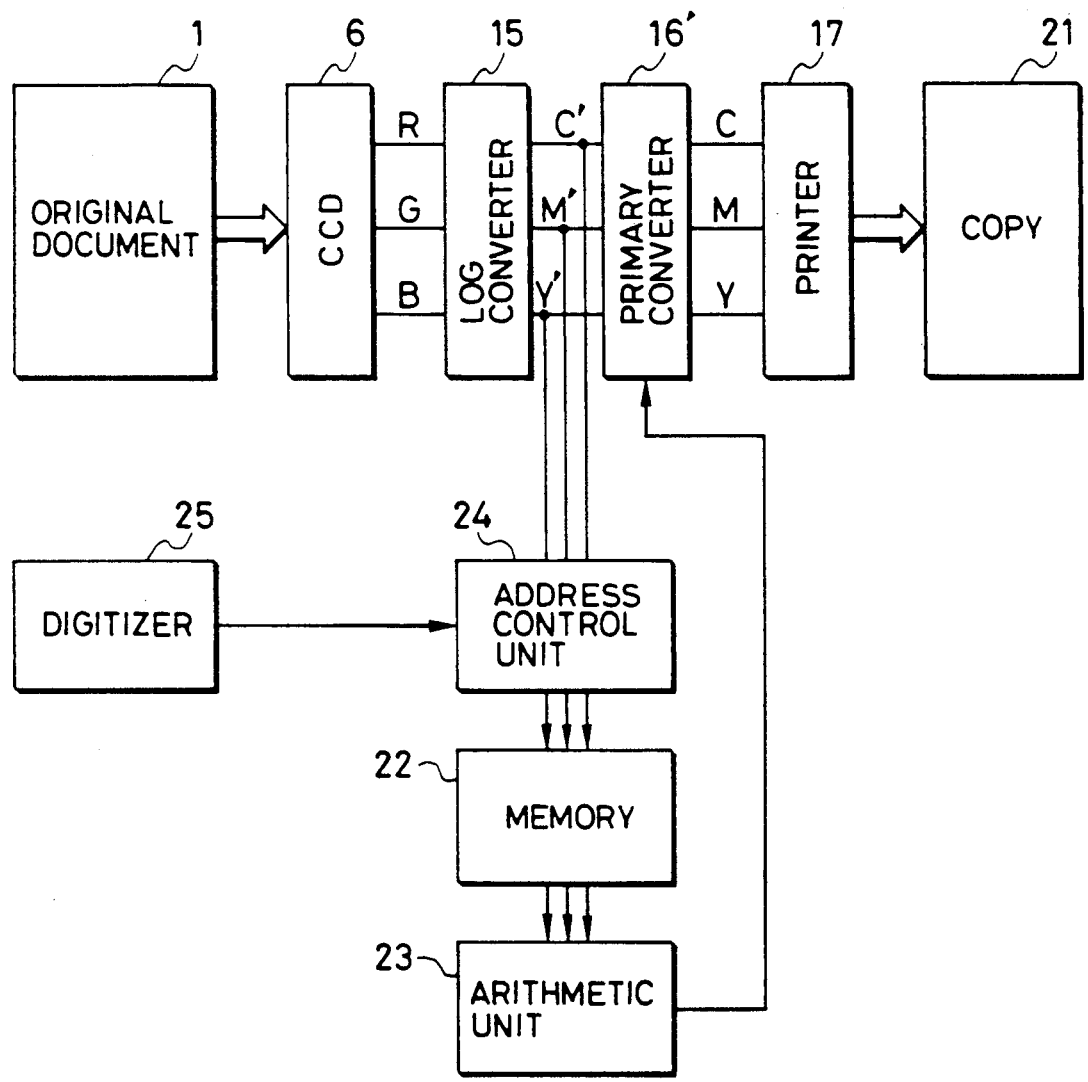
FIG. 9 is a control block diagram of a second embodiment according to the present invention.

FIGS. 8A and 8B show a perspective view of a reader 7 having a digitizer 25, and FIG. 9 is a block diagram showing the entirety of the circuit arrangement.

Referring to the Figures, reference number 25 represents an original press plate which is used also as a digitizer, and reference number 26 represents a position designating light pen.

First, a standard original is placed on the digitizer 25 with the front surface of the original turned upward to then designate a desired number of positions subjected to color adjustment by using the light pen.

Next, the standard original is placed on a platen glass 2 with the rear surface thereof turned downward to then depress a copy start button.

Then, the original 1 is pre-scanned so that color signal values $C_l'$, $M_l'$ and $Y_l'$ at the points designated by the digitizer 25 are stored in a memory 22 under control of an address control unit 24 (FIG. 9) which is also controlled by the digitizer 25.

By using the data stored in the memory 22, the above-mentioned arithmetic operation is carried out by an arithmetic unit 23 to thereby obtain the color correction coefficients $b_{ij}$.

The obtained correction coefficients are set at the primary converter 16' to carry out an actual copying operation similar to that described with the first embodiment.

In case that the number of points designated by the digitizer 25 is small, the data previously obtained may be remained stored in the memory 22 to use them at such a case and obtain the coefficients more precisely.

Areas in an original may be designated instead of positions.

As described above, it becomes possible to set color correction coefficients in an extremely precise manner and obtain a high fidelity color reproduction of an original.

Next, a third embodiment of the present invention will be described.

Figure 11:
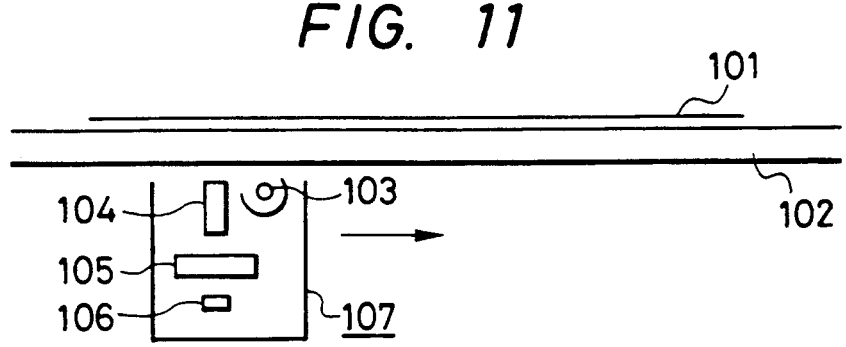
FIG. 11 is a cross section of an original reading apparatus.

FIG. 11 is a schematic illustration of an optical reading system of a color image forming apparatus embodying the present invention. In the Figure, reference number 101 denotes an original, 102 an original support glass for an original 101, 103 an illuminating unit, 104 an image focussing element array, 105 an infrared cut filter, 106 a tight contact type CCD color sensor (hereinafter simply called CCD), and 107 an optical system.

Figure 12:
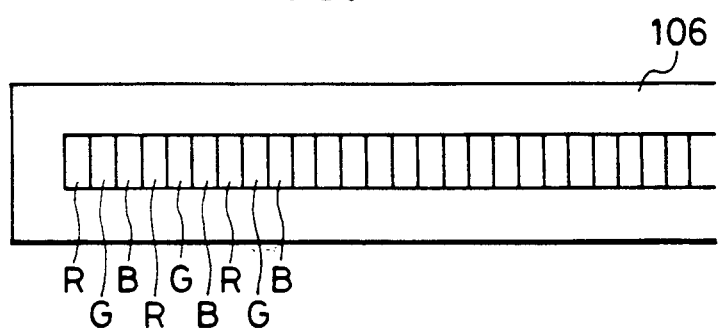
FIG. 12 is an enlarged view showing the surface of a CCD.

A read process for an original will first be described. Upon depression of a copy key (not shown), the illumination unit 103 applies light to an original 101, and the reflected light from the original passes through the image focussing element array 104 and the infrared cut filter 105 to focus an original image on the CCD 106. The optical unit 107 is moved in the direction indicated by an arrow to scan the original. The CCD 106 includes R, G and B filters for each pixel disposed regularly as shown in FIG. 12.

Figure 13:
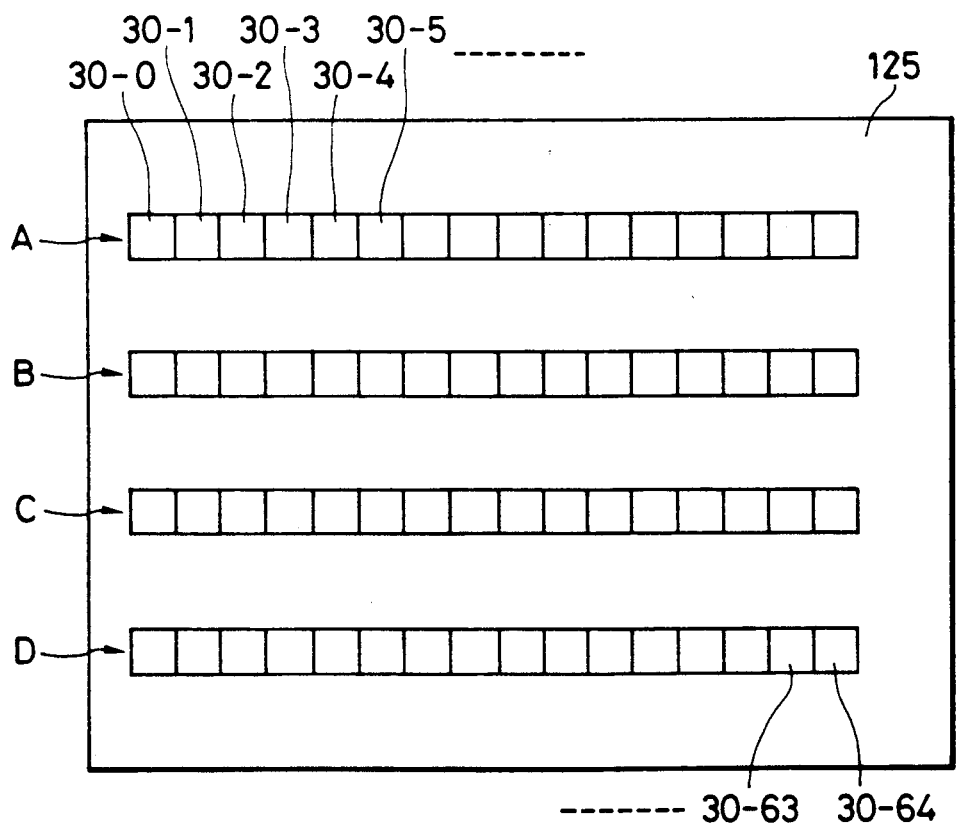
FIG. 13 is a view showing an example of a standard color original.

As the original is scanned, electrical signals from the CCD 10 are sequentially processed by a signal processing circuit, as illustratively shown in FIG. 13.

Figure 10:
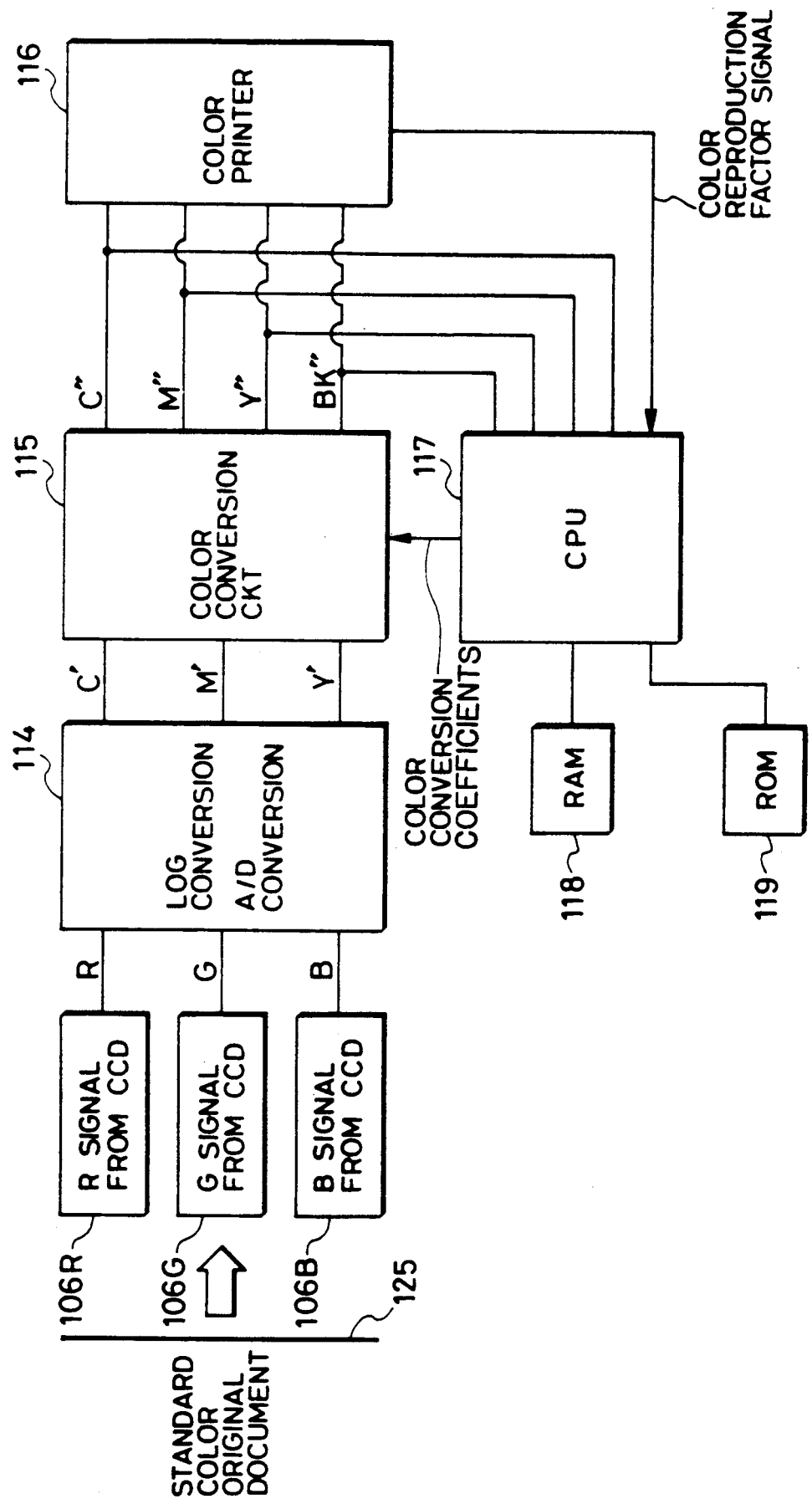
FIG. 10 is a block diagram of a third embodiment according to the present invention.

References 106R, 106G and 106B shown in FIG. 10 represent signals obtained from corresponding R, G and B elements of the CCD 106. These R, G and B signals are applied to a circuit 114 which performs logarithmic conversion and A/D conversion, and converted into Y', M' and C' signals in digital form. These Y', M' and C' signals are applied to a color conversion circuit 115 which performs a masking process and an under color removal process. The color conversion circuit 115 carries out the arithmetic operation expressed by the following equation (i):

$$\begin{bmatrix} Y'' \\ M'' \\ C'' \\ Bk'' \end{bmatrix} = \begin{bmatrix} a_{11} & a_{12} & a_{13} & 0 \\ a_{21} & a_{22} & a_{23} & 0 \\ a_{31} & a_{32} & a_{33} & 0 \\ 0 & 0 & 0 & a_{44} \end{bmatrix} \begin{bmatrix} Y' \\ M' \\ C' \\ (Y',M',C')_{min} \end{bmatrix} - \begin{bmatrix} 0 \\ 0 \\ 0 \\ b_4 \end{bmatrix} \quad (i)$$

wherein $(Y', M', C')_{min}$ represents a minimum signal among Y', M' and C' signals, and $a_{11}$ to $a_{44}$ and $b_4$ are color conversion coefficients.

Reference number 116 denotes a color printer such as a laser color printer, 117 a central processing unit CPU, 118 a random access memory RAM, and 119 a read-only memory ROM storing color arithmetic operation programs (to be described later in detail) to be executed by the CPU.

The Y''', M''', C''' and Bk'' signals are used for visualizing an original image by a color image forming apparatus such as heat sensitive color transfer printer, an ink jet color printer or a laser beam color printer.

The characteristic required for a color image forming apparatus constructed of an image reader and an image printer must present a same image output when reading a same original. To this end, a feedback loop shown in FIG. 10 is employed.

Referring to FIG. 10, a standard color original 125 is defined by known chromaticity coordinate values. As the standard color original 125, a tonal pattern with 64 colors printed in the configuration shown in FIG. 13 is used.

The standard color original 125 is read by using the optical unit 107 shown in FIG. 11. The color conversion coefficients for the color conversion circuit 115 are determined so as to make the Y''', M''', C''' and Bk'' signals of the color conversion circuit 115 coincide with the target values shown in FIG. 14.

The Y, M, C and Bk target values are determined based on the type of a color printer to be used and the color reproduction factors. For instance, assuming that a P color (corresponding to P point in the CIELUV diagram) is present in the standard color original shown in FIG. 13, the target read-out values (Y, M, C, Bk) become (3/3, 0, 3/3, 0), (2/3, 0, 2/3, 0) and (1/3, 0, 1/3, 0) in order to obtain a high fidelity reproduction of the original by printers (a), (b) and (c), respectively.

If a color conversion circuit 115 is capable of processing colors in 256 tonal levels, "0", "1", "2" and "3" shown in FIG. 14 are changed to 0, 85, 170 and 255 levels, respectively. The color No. 0 indicates that no color toners are used for the printing.

Next, the read process of the standard color original 125 constructed as above will be described in detail.

Figure 15:
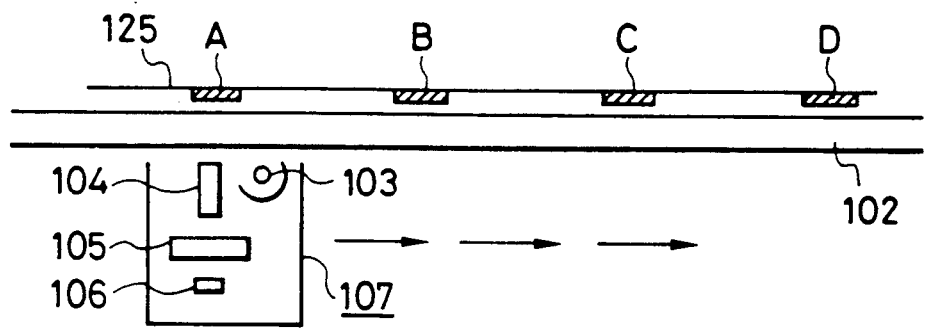
FIG. 15 illustrates the operation of the third embodiment.
Figure 17:
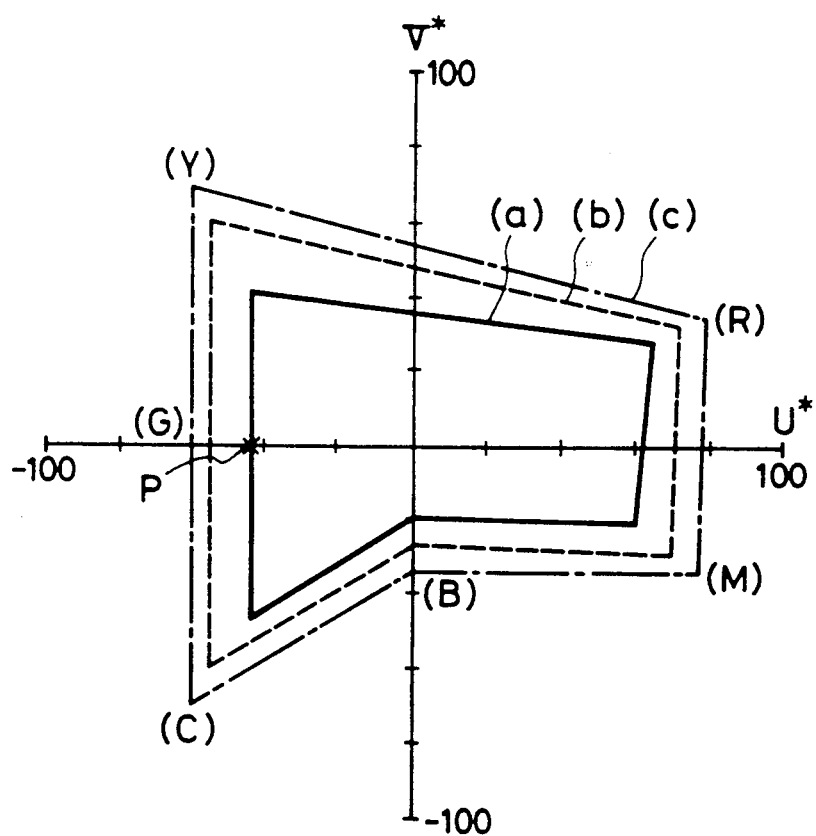
FIG. 17 shows Y, M, C and Bk target values associated with various printers and color reproduction factors.

As shown in FIG. 15, similar to setting an ordinary original, the standard color original 125 is set at a predetermined position on the original support glass 102. A key (not shown) for designation a test mode is depressed. Then, the optical unit 107 stops at the position A on the standard color original 125 so that the original is illuminated by the illuminating unit 103 to read a color mixture pattern by the CCD 106 of which the readout information is stored in the RAM 118. Next, the optical unit 107 is moved to the position B to read another color mixture pattern similar to position A. Color mixture patterns at positions C and D are also read to store them in the RAM 108. By repeating similar operations to the above, the output values Yi', Mi' and Ci' (wherein i represents the No. shown in FIG. 14) corresponding to 64 color patterns can be obtained In addition, a standard white plate (not shown) is placed at the top end of the original support glass, and the reflected light from the standard white plate is read by the CCD 106 to conduct a shading correction of the output values Yi', Mi' and Ci' based on the output values Yw, Mw and Cw of the standard white plate The shading correction is performed after the logarithmic conversion so that a process of $Y = 255 - Yw + Yi'$ for example can be carried out also for Mi' and Ci' in a similar manner.

By using the values after the shading correction as new output values Yi', Mi' and Ci', the Yi'', Mi'', Ci'' and Bk'' in conformity with the above equation (i) are obtained. Thereafter, the coefficients of the equation (i) determined as in the following so as to obtain values near those predetermined target output values Y, M, C and Bk shown in FIG. 14.

The evaluation functions for yellow, magenta and cyan are defined as $\phi_Y$, $\phi_M$ and $\phi_C$. As for yellow, the following equations stand:

$$\frac{\partial \phi_Y}{\partial a_{11}} = 2\left\{\left(\sum_i Y_i' Y_i'\right)a_{11} + \left(\sum_i M_i' Y_i'\right)a_{12} + \left(\sum_i C_i' Y_i'\right)a_{13} - \left(\sum_i Y_i Y_i'\right)\right\} = 0$$

$$\frac{\partial \phi_Y}{\partial a_{12}} = 2\left\{\left(\sum_i Y_i' M_i'\right)a_{11} + \left(\sum_i M_i' M_i'\right)a_{12} + \left(\sum_i C_i' M_i'\right)a_{13} - \left(\sum_i Y_i M_i'\right)\right\} = 0$$

$$\frac{\partial \phi_Y}{\partial a_{13}} = 2\left\{\left(\sum_i Y_i' Y_i'\right)a_{11} + \left(\sum_i M_i' C_i'\right)a_{12} + \left(\sum_i C_i' M_i'\right)a_{13} - \left(\sum_i Y_i C_i'\right)\right\} = 0$$

With similar equations for magenta and cyan, the following equation is obtained:

$$\begin{bmatrix} \sum_i Y_i'Y_i' & \sum_i M_i'Y_i' & \sum_i C_i'Y_i' \\ \sum_i Y_i'M_i' & \sum_i M_i'M_i' & \sum_i C_i'M_i' \\ \sum_i Y_i'C_i' & \sum_i M_i'C_i' & \sum_i C_i'C_i' \end{bmatrix} \begin{bmatrix} a_{11} & a_{21} & a_{31} \\ a_{12} & a_{22} & a_{32} \\ a_{13} & a_{23} & a_{33} \end{bmatrix} =$$

$$\begin{bmatrix} \sum_i Y_i Y_i' & \sum_i M_i Y_i' & \sum_i C_i Y_i' \\ \sum_i Y_i M_i' & \sum_i M_i M_i' & \sum_i C_i M_i' \\ \sum_i Y_i C_i' & \sum_i M_i C_i' & \sum_i C_i C_i' \end{bmatrix}$$

By expressing the above equations as $[C][A] = [D]$, the coefficients $a_{11}$ to $a_{33}$ can be obtained from $A = C^{-1} \times D$. Where $C^{-1}$ is an inverse matrix of C.

Next, the evaluation coefficient is defined as for $a_{44}$ and $b_4$. Then, the following equation stand using the evaluation coefficient $\phi$:

$$\phi = \sum_i (a_{44}(Y_i', M_i', C_i')_{min} - b_4 - B_{Ki})^2$$

$$\frac{\partial \phi}{\partial a_{44}} = 2\left( \sum_i (Y_i', M_i', C_i')^2_{min} a_{44} - \sum_i (Y_i', M_i', C_i')_{min} b_4 - \sum_i B_{Ki}(Y_i', M_i', C_i')_{min} \right) = 0$$

$$\frac{\partial \phi}{\partial b_4} = 2\left( \left(\sum_i (Y_i', M_i', C_i')_{min} a_{44} - (\Sigma 1)b_4 - \sum_i B_{Ki}\right) \right) = 0$$

Therefore, $$\begin{bmatrix} \sum_i (Y_i'M_i'C_i')^2_{min} & \sum_i (Y_i'M_i'C_i')_{min} \\ \sum_i (Y_i'M_i'C_i')_{min} & \sum_i 1 \end{bmatrix} \begin{bmatrix} a_{44} \\ b_4 \end{bmatrix} =$$

$$\begin{bmatrix} \sum_i (Y_i'M_i'C_i')_{min} \cdot B_{Ki} \\ \sum_i B_{Ki} \end{bmatrix}$$

By expressing the above equations as $[E][F] = [G]$, the coefficients $a_{44}$ to $b_4$ are obtained from $F = E^{-1} \times G$. Where $E^{-1}$ is an inverse matrix of E.

The arithmetic operation for obtaining the coefficients $a_{11}$ to $a_{33}$, $a_{44}$ and $b_4$ is executed by the CPU 118 and the newly obtained coefficients are input to the color conversion circuit 105.

As appreciated from the foregoing description, it is possible to control the Y, M, C and Bk outputs read out from the standard color original 125 composed of 64 evaluation colors so as to have values near the target ones.

Further, by choosing evaluation colors uniformly on an equal color difference space, substantially a same output can be obtained for all colors. Furthermore, by choosing an evaluation color at a particular color on a color original, it becomes possible to obtain precisely a same output for that particular color.

Finally, the color reproduction factor signal derived from the color printer 116 (see FIG. 10) will be explained taking a laser beam color printer as an example.

Figure 16:
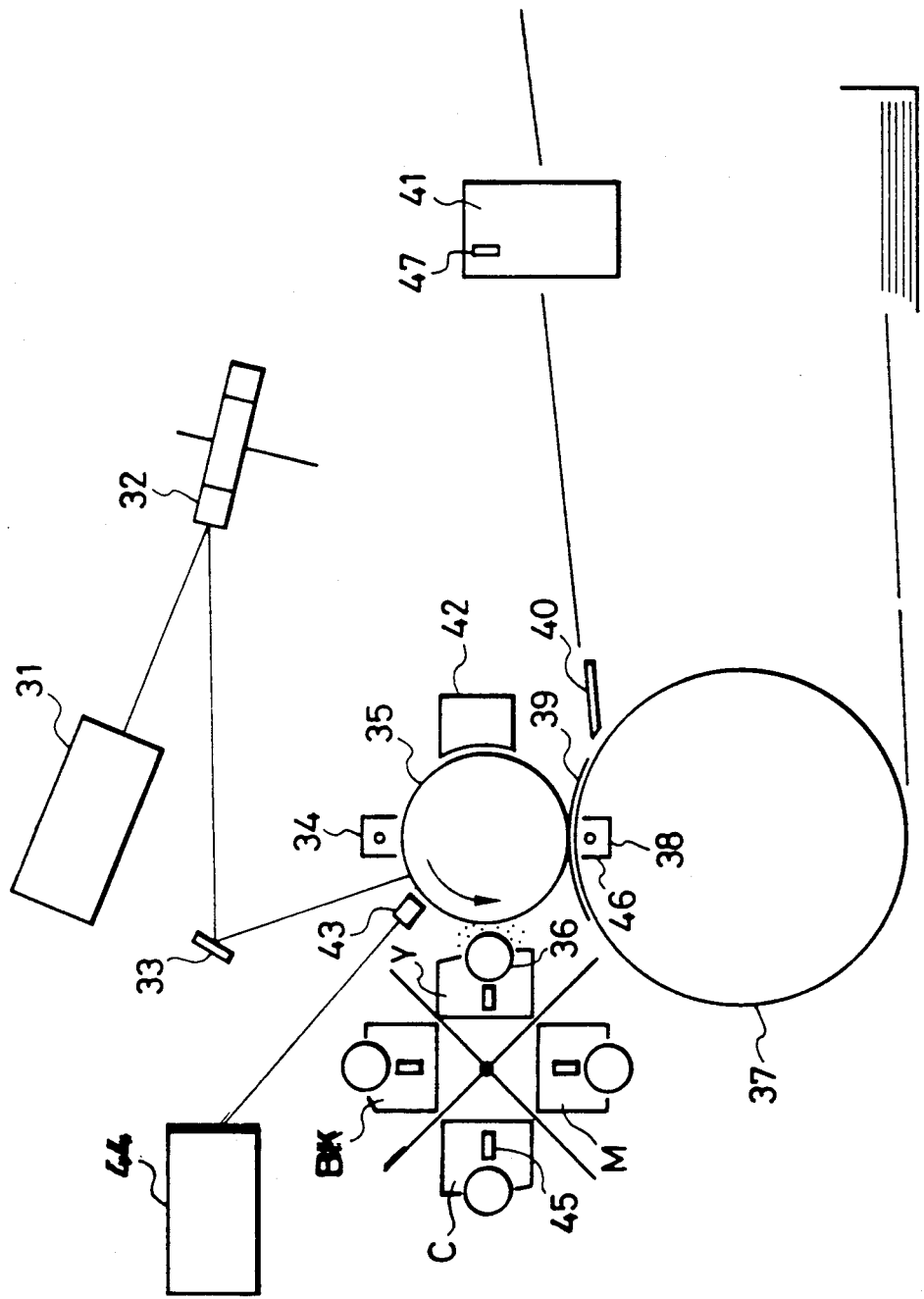
FIG. 16 is a cross section showing the structure of a laser beam printer.

FIG. 16 is a cross section showing the structure of a laser beam color printer. A laser beam modulated by a laser driver 31 is applied to a photosensitive drum 35 (uniformly charged by a charger 34) via a polygonal mirror 32 and a mirror 33 to thus form an electrostatic latent image. The photosensitive drum 35 rotates in the direction indicated by an arrow. A rotary developer 36 develops each color.

The toner image thus obtained is transferred independently for each yellow, magenta, cyan and black by a transfer charger 38. After the transfer, a sheet of paper 39 is separated from a transfer drum 37 for the fixation by a fixer 41. Toner remaining after the fixation are removed by a cleaner 42.

The characteristic of a color reproduced from input signals by a laser beam color printer of this type depends on, e.g., the contrast of an electrostatic latent image, the toner density, the transfer efficiency, the fixation temperature, the environmental temperature and humidity, and the like.

As for the electrostatic latent image contrast, it is possible to measure the potential at bright and dark portions on the photosensitive drum and make the potential near at the target potential by using a potential control unit 44. As for the toner density, it can be measured by a toner density sensor 45 in the developer to maintain it constant under control of a toner feed system. As for the transfer efficiency, a transfer current to the drum can be measured to thereby control it. As for the fixation temperature, it can be measured by a temperature sensor 47 within the fixer 41 to thereby control it. The environmental temperature and humidity can be controlled using a heater or the like. Thus, the color reproduction factors affecting the color reproduction characteristic can be picked up and outputted.

Therefore, if the type of an output printer and the color reproduction factor are identified, a precise correspondence between the input signal and the reproduced color can be obtained.

It is not intended to be limited to a printer of an electronic photography type but other printers of an ink jet type, a heat transfer type and the like may be applied.

As appreciated from the foregoing description, since color conversion coefficients are automatically set, advantageously the user carries out only a reading of a standard color original and needs not perform cumbersome color adjustment.

Further since the color correction characteristic can be automatically adjusted if necessary, the color reproduction is always maintained constant. Furthermore, even in a change of the type of an output device or a color reproduction factor, the cumbersome color adjustment is not needed to be performed again.

Next, a fourth embodiment of the present invention will be described, wherein the third embodiment is applied to a color reading apparatus.

Similar elements to those shown in FIG. 10 have been represented by using identical references in FIG. 18.

Referring to FIG. 18, a standard color original 125 is defined by known chromaticity coordinate values. As the standard color original 125, a tonal pattern with 64 colors printed in the configuration shown in FIG. 13 is used.

The standard color original 125 is read using the optical unit 107 shown in FIG. 11. The color conversion coefficients for the color conversion circuit 115 are determined so as to make the Y'', M'', C'' and Bk'' signals of the color conversion circuit 115 coincide with the target values shown in FIG. 14. If a color conversion circuit 115 is capable of processing colors in 256 tonal levels, "0", "1", "2" and "3" shown in FIG. 14 are changed to 0, 85, 170 and 255 levels, respectively. The color No. 0 indicates that no color toners are used for the printing.

Next, the standard color original 125 constructed as above is read in a similar manner to that described with third embodiment to thereby obtain Yi', Mi' and Ci' outputs corresponding to each of 64 color patterns. The coefficients $a_{11}$ to $a_{44}$, and $b_4$ of the equation (i) are obtained by the CPU 118 using the similar evaluation functions to those described with the third embodiment.

The newly obtained coefficients $a_{11}$ to $a_{33}$, $a_{44}$ and $b_4$ are inputted to the color conversion circuit 115.

As appreciated from the foregoing description, it is possible to control the Y, M, C and Bk outputs read out from the standard color original 125 composed of 64 evaluation colors so as to have values near the target ones.

Further, by choosing evaluation colors uniformly on an equal color difference space, substantially a same output can be obtained for all colors. Furthermore, by choosing an evaluation color at a particular color on a color original, it becomes possible to obtain precisely a same output for that particular color.

As appreciated from the foregoing description of this embodiment, since color conversion coefficients are automatically set also for a color reading apparatus, advantageously the user carries out only a reading of a standard color original and needs not perform cumbersome color adjustment.

In the above first to fourth embodiments, an optimum color reproduction is ensured even in case of a change in the characteristic of a reading system. In the following fifth embodiment, it is intended to ensure an optimum color reproduction even in case of a change in the characteristics of both the reading system and the output system.

Figure 19:
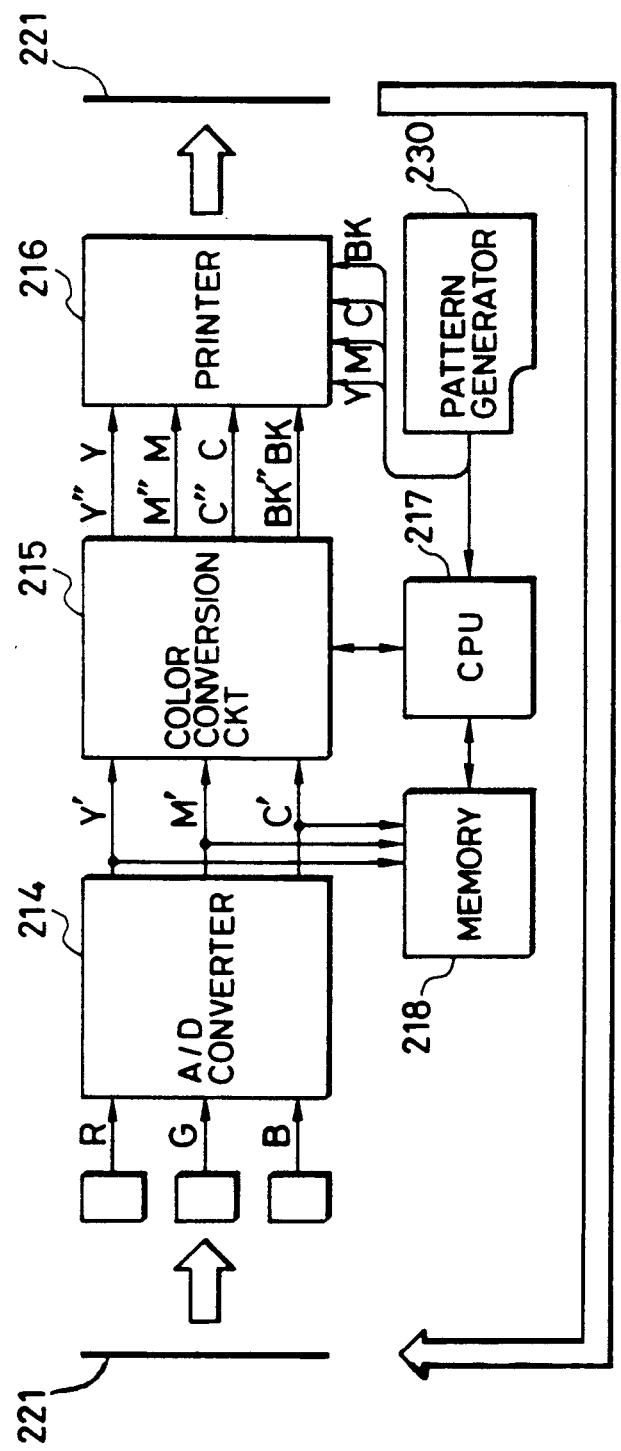
FIG. 19 is a block diagram showing an example of the structure according to a fifth embodiment of the present invention.
Figure 20A:
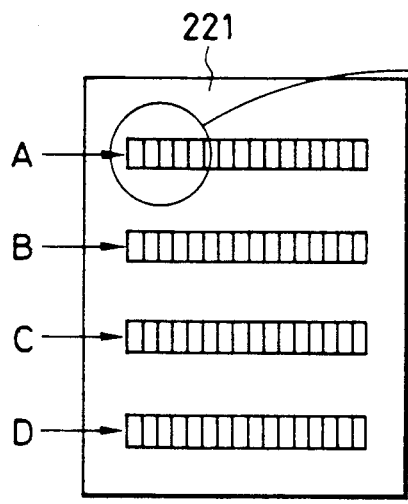
FIGS. 20A and 20B illustrate the color correction of the fifth embodiment.
Figure 20B:
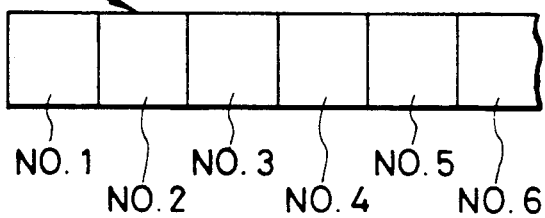

FIG. 19 shows an example of the structure of the fifth embodiment.

Referring to FIG. 19, a pattern generator 230 stores color mixture ratios in the form of a table as shown in FIG. 21.

A feedback loop shown in FIG. 21 is provided. Namely, upon depression of a test mode key (not shown), a predetermined pattern is applied directly to a printer 216 from the pattern generator 230 to thereby print the pattern composed of various colors.

The pattern is composed of colors Yi, Mi, Ci and Bki (i represents the No. in FIG. 21) with a mixture thereof slightly changed for each color. In case of producing a 64 color pattern, each color of No. 0 to No. 63 is set beforehand in the table shown in FIG. 21.

The table is stored in a memory within the pattern generator 230. If a printer 216 is capable of processing colors in 256 tonal levels, "0", "1", "2" and "3" shown in FIG. 14 are changed to 0, 85, 170 and 255 levels, respectively. The color No. 0 indicates that no color toners are used for the printing.

Figure 22:
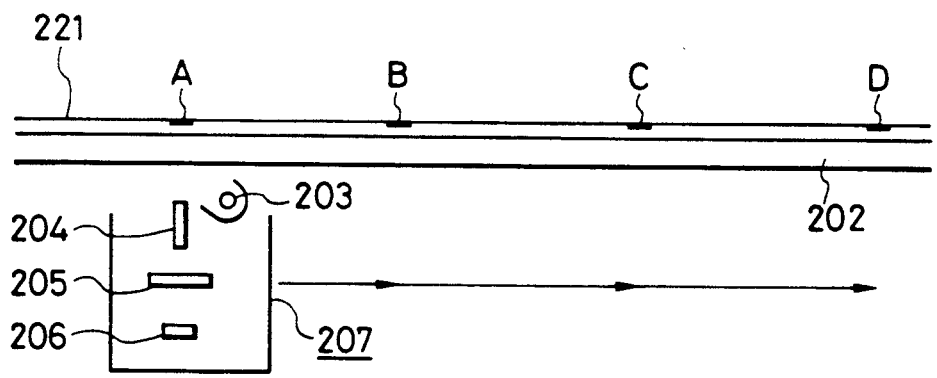
FIG. 22 illustrates an example of the operation of the fifth embodiment.

Next, a user of the copying machine sets a sheet of paper 221 with 64 colors printed as described above at a predetermined position on the original support glass 220 in a similar manner to that an original is set as shown in FIG. 22.

Then, as the user depresses La test mode key (not shown), the optical unit 207 stops at position A of the sheet of printed paper 221 as shown in FIG. 22. The paper is illuminated by the illuminating unit 203 and its color mixture pattern is read by the CCD 206 to thereby store the information in the RAM 218.

Next, the optical unit 207 is moved to position B to read another color mixture pattern in a similar manner to that at position A. Similarly, color mixture patterns at positions C and D are read to store the information in the RAM 218. The above operations are repeated to obtain output values Yi', Mi' and Ci' (i represents the number of pattern) corresponding to 64 color patterns.

Next, a standard white plate is placed at the top end of the original support glass in the scan direction. The reflected light from the standard white plate is read by the CCD 206 by using the optical unit 207. Shading correction of the output values Yi', Mi' and Ci' is performed based on the output values Yw, Mw and Cw from the standard white plate. The shading correction is performed after the logarithmic conversion so that a process of $Y = 255 - Yw + Yi'$ for example can be carried out also for Mi' and Ci' in a similar manner.

The values after the shading correction are used as new output values Yi', Mi' and Ci'. The coefficients of the equation (i) are determined such that the values Yi'', Mi'', Ci'' are Bki'' converted from the output values Yi', Mi' and Ci' by the color conversion circuit 215 become equal to the values Yi, Mi, Ci and Bki previously set by the pattern generator 230.

The evaluation functions for yellow, magenta and cyan are defined as $\phi_Y$, $\phi_M$ and $\phi_C$. As for yellow, the following equations stand:

$$\phi_Y = \sum_i (a_{11} Y_i' - a_{12} M_i' - a_{13} C_i' - Y_i)^2$$

$$\frac{\partial \phi_Y}{\partial a_{11}} = A \left\{ \left( \sum_i Y_i' Y_i' \right) a_{11} - \left( \sum_i M_i' Y_i' \right) a_{12} - \left( \sum_i C_i' Y_i' \right) a_{13} - \left( \sum_i Y_i Y_i' \right) \right\} = 0$$

$$\frac{\partial \phi_Y}{\partial a_{12}} = A \left\{ \left( \sum_i Y_i' M_i' \right) a_{11} + \left( \sum_i M_i' M_i' \right) a_{12} + \left( \sum_i C_i' M_i' \right) a_{13} - \left( \sum_i Y_i M_i' \right) \right\} = 0$$

$$\frac{\partial \phi_Y}{\partial a_{13}} = A \left\{ \left( \sum_i Y_i' Y_i' \right) a_{11} + \left( \sum_i M_i' C_i' \right) a_{12} + \left( \sum_i C_i' M_i' \right) a_{13} - \left( \sum_i Y_i C_i' \right) \right\} = 0$$

With similar equations for magenta and cyan, the following equations are obtained:

$$X = \begin{bmatrix} \sum_i Y_i'Y_i' & \sum_i M_i'Y_i' & \sum_i C_i'Y_i' \\ \sum_i Y_i'M_i' & \sum_i M_i'M_i' & \sum_i C_i'M_i' \\ \sum_i Y_i'C_i' & \sum_i M_i'C_i' & \sum_i C_i'C_i' \end{bmatrix}$$

$$Y = \begin{bmatrix} a_{11} & a_{21} & a_{31} \\ a_{12} & a_{22} & a_{32} \\ a_{13} & a_{23} & a_{33} \end{bmatrix}$$

$$Z = \begin{bmatrix} \sum_i Y_i Y_i' & \sum_i M_i Y_i' & \sum_i C_i Y_i' \\ \sum_i Y_i M_i' & \sum_i M_i M_i' & \sum_i C_i M_i' \\ \sum_i Y_i C_i' & \sum_i M_i C_i' & \sum_i C_i C_i' \end{bmatrix}$$

Assuming that $X = C$, $Y = A$ and $Z = D$, then $A = C^{-1}$ stands. Thus, the coefficient $a_{11}$ to $a_{33}$ can be obtained ($c^{-1}$ is an inverse matrix of C).

Next, the evaluation coefficient is defined as for $a_{44}$ and $b_4$. Then, the following equations stand using the evaluation coefficient $\phi$:

$$\phi = \sum_i (a_{44}(Y_i'. M_i'. C_i')_{min} - b_4 - B_{Ki})^2$$

$$\frac{\partial \phi}{\partial a_{44}} = 2\left\{\left(\sum_i (Y_i'. M_i'. C_i')_{min} a_{44} - \sum_i (Y_i'. M_i'. C_i') b_4 - \sum B_{Ki}(Y_i'. M_i'. C_i')_{min}\right)\right\} = 0$$

$$\frac{\partial \phi}{\partial b_4} = 2\left\{\left(\sum_i (Y_i'. M_i'. C_i')_{min} a_{44} - (\Sigma 1)b_4 - \sum_i B_{Ki}\right)\right\} = 0$$

Therefore, $$X' = \begin{bmatrix} \sum_i (Y_i'. M_i'. C_i')^2_{min} & \sum_i (Y_i'. M_i'. C_i')_{min} \\ \sum_i (Y_i'. M_i'. C_i')_{min} & \sum_i 1 \end{bmatrix}$$

$$Y' = \begin{bmatrix} a_{44} \\ b_4 \end{bmatrix}$$

$$Z' = \begin{bmatrix} \sum_i (Y_i'. M_i'. C_i')_{min} \cdot B_{Ki} \\ \sum_i B_{Ki} \end{bmatrix}$$

Assuming that $X' = E$, $Y' = F$ and $Z' = G$, then the coefficients $a_{44}$ and $b_4$ are obtained from $F = E^{-1} \times G$ ($E^{-1}$ is an inverse matrix of E).

The arithmetic operation for obtaining the coefficients $a_{11}$ to $a_{33}$, $a_{44}$ and $b_4$ is executed by the CPU 218 and the newly obtained coefficients $a_{11}$ to $a_{33}$, $a_{44}$ and $b_4$ are set at the color conversion circuit 215. After setting the coefficients, an ordinary original is set on the original support glass to perform a color copying.

As appreciated from the foregoing description, it is possible to obtain a printed color the same as that of an original.

The above embodiment is also applicable to an ink jet printer and a heat transfer printer as well as an electronic photography type color copying machine shown in FIG. 16.

As described so far, since the arithmetic operation of obtaining the coefficients of the color processing circuit is automatically performed, advantageously a user of the color copying machine is not required to perform cumbersome color adjustment if only the user set a printed paper on the original support glass.

Particularly, it is possible to obtain an optimum color reproduction even if the color reproduction characteristic of the printer unit or the reading unit changes, or the printer unit or the reading unit is replaced by another one.

Next, a sixth embodiment will be described wherein signal values of a tonal pattern on a recording medium obtained by means of photoelectric converter means are compared with values stored in memory means to judge the color balance status at output means, and the judge result is displayed.

Figure 24:
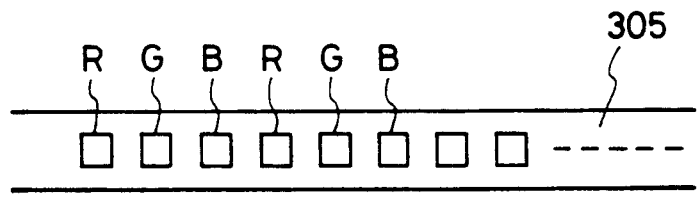
FIG. 24 illustrates a tight contact type color CCD.
Figure 25:
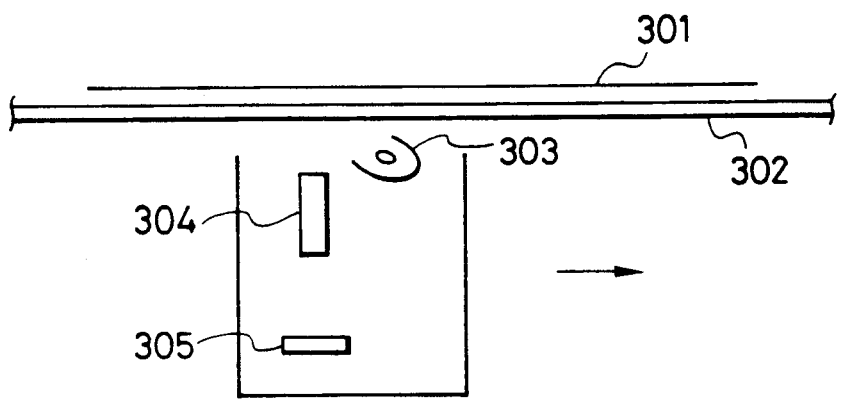
FIG. 25 shows the structure of a reader unit.

FIG. 25 shows the reading unit of a color copying machine of the sixth embodiment of this invention. An original 301 placed on an original support glass 302 is illuminated by an illuminating unit 303. An image of the original 301 is focussed on a tight contact type color CCD 305 via an image focussing element array 304. The illuminating unit 303, the image focussing element array 304 and the CCD 305 constitute one unit which is moved in the direction indicated by an arrow to thereby scan an original 301. The CCD 305 constitutes a light receiving element array composed of a plurality of light receiving elements on which red, green and blue filters are disposed in this order sequentially as shown in FIG. 24.

Figure 23:
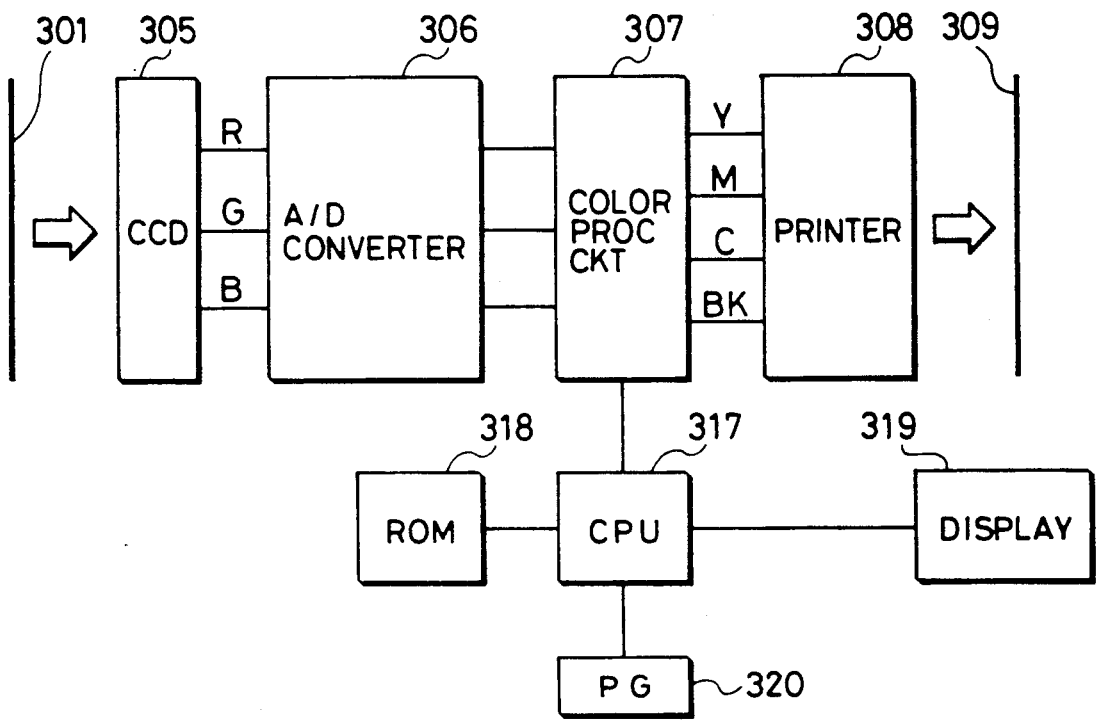
FIG. 23 is a block diagram of a color processing circuit constituting a main part of a sixth embodiment according to the present invention.

FIG. 23 shows the main part of this embodiment. Signals read by the CCD 305 are digitalized by an A/D converter 306 and converted into yellow, magenta, cyan and black output signals by a color processing circuit 307. The converted signals drive a laser driver 308 to thereby form a color image of an original on a recording medium 309 (copy paper).

Figure 26:
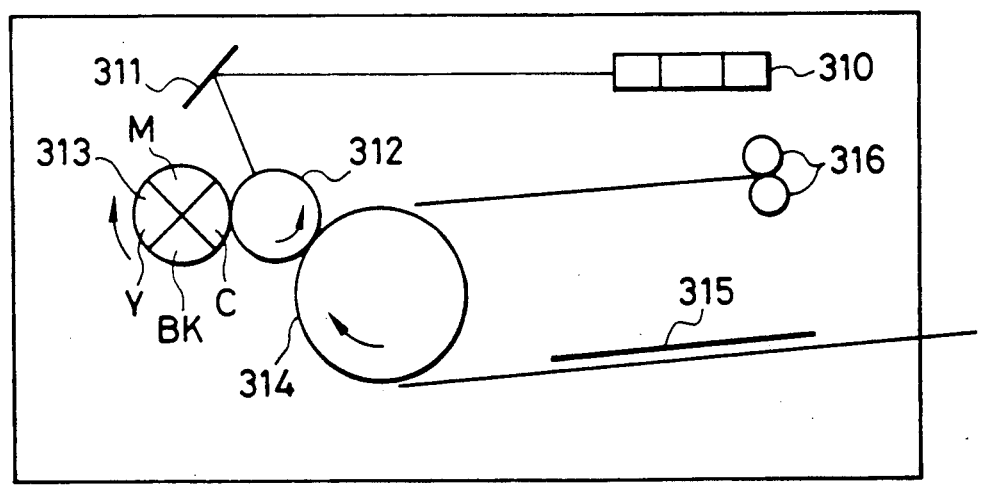
FIG. 26 shows the structure of a printer.

FIG. 26 shows the printer unit of this embodiment. As a laser (not shown) is driven by the laser driver, a laser beam from the laser is scanned by a polygonal mirror 310 to apply it onto a photosensitive drum 312 via a mirror 311.

The drum 312 is rotated in the direction indicated by an arrow. An original image is developed by a rotary developer 313.

A transfer sheet 315 (recording medium) is wound about a transfer drum 314. A toner image developed by the drum 312 is transferred to the transfer sheet 315. The exposure, development and transfer are performed four times for each C, M, Y and Bk (the rotary developer 313 rotates each time in order to change a toner color). After performing the transfer four times, the transfer sheet 315 is removed from the transfer drum and fixed by a fixer 316.

Figure 27:
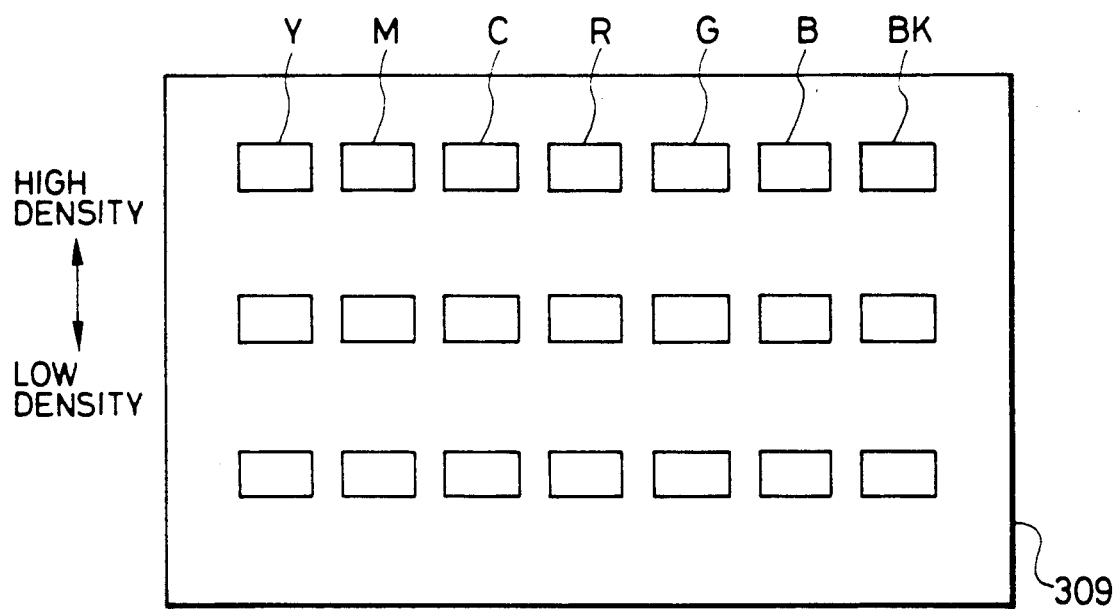
FIG. 27 shows an example of outputs from a pattern generator.
Figure 28:
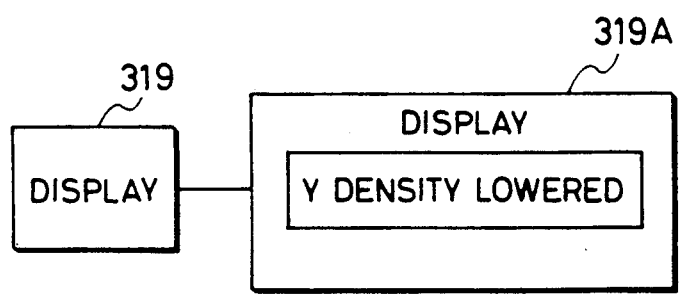
FIG. 28 schematically shows a display unit.

Referring to FIG. 23, a pattern generator PG 320 generates a tonal pattern signal with the color density changed for each Y, M, C, Bk, B (mixture of M and C), G (mixture of C and Y) and R (mixture of M and Y). A CPU 317 controls the color processing circuit 307 based on a signal from the PG 320 and forms a tonal pattern as shown in FIG. 27 on a recording medium 309. A ROM 318 stores R, G and B signal values of correct colors of a tonal pattern generated by the PG 320 and read by means of the CCD 305 and the signal processing circuit 306.

Under control of the CPU 317, the correct R, G and B signal values in the ROM 318 are compared with actual R, G and B signal values of a tonal pattern generated by the PG and read by means of the CCD 305 and the signal processing circuit 306 while the printer of this embodiment is being used. The comparison result is displayed on a display 319 (such as liquid crystal or CRT). For instance, if the R, G and B signal values read from the Y portion shown in FIG. 27 are 1, 1 and 0 and the R, G and B signal values in the ROM 318 are 1, 1 and 0, the CPU 317 judges that it is normal for yellow and instructs a driver included in the display 319 to display, e.g., "Y DENSITY NORMAL" on a display 319A. Alternatively, if the R, G and B signal values read from the Y portion become 0.5, 0.5 and 0 because of the deterioration of the printer performance, since the corresponding values in the ROM 318 are 1, 1 and 0, the CPU 317 judges that the development and transfer characteristics for yellow have become bad, and it instructs to display "Y DENSITY LOWERED" on the display 319A. Thus, the user is instructed to make the Y density higher. If the density has lowered too much (e.g., the read-out R, G and B signal values of 0.1, 0.1 and 0), a display of "Y TONER EMPTY" may be effected on the display. Instead of such display, the CPU 317 may automatically control the charge amount, bias level, laser output intensity or the like, in accordance with the comparison data.

As seen from the above description of this embodiment, a self-diagnosis of the copying machine can be carried out very easily thus ensuring a simple adjustment of color balance by a service man or an operator.

As appreciated from the foregoing description of the present invention, the color processing characteristic of a color image reading apparatus, a color image forming apparatus, or a color image copying machine can be set very easily.

The present invention is not intended to be limited to the above embodiments, but various applications and modifications are possible without departing from the scope of the appended claims.

We claim:

1. A color copying machine comprising:
   reading means for reading a color original;
   correction means for performing a color correction processing of a color image signal from said reading means;
   image forming means for forming a color image based on a correction output from said correction means;
   designation means for designating a predetermined region of the color original read by said reading means, wherein the color original is one formed by said image forming means;
   setting means for setting a correction characteristic of the color correction processing based on the color image signal read by said reading means, wherein said setting means sets a correction characteristic on the basis of a color image signal of said region designated by said designating means.

2. A color copying machine according to claim 1, wherein said setting means includes memory means for storing a predetermined value and said reading means reads a predetermined standard color original, and wherein said setting means sets said correction characteristic based on a read-out value from said reading means and said stored predetermined value.

3. A color copying machine according to claim 2, wherein said setting means sets said correction characteristic based on a plurality of read-out values and a plurality of stored values.

4. A color copying machine according to claim 1, wherein said correction means has a color correction characteristic and said setting means sets said color correction characteristic.

5. A method of setting a color correction characteristic of a color reproducing system including a color image reading unit, a color correction unit and a color image forming unit, said method comprising the steps of:
   recording a color pattern including a plurality of predetermined colors by suing said color image forming unit;
   reading colors within a manually set region including said recorded color pattern by using said color image reading unit; and
   obtaining a color correction parameter from a plurality of colors read by said reading unit and a plurality of colors to be recorded by said recording unit, and then determining a color correction characteristic of said color correction unit on the basis of the color correction parameter.

6. A method according to claim 5, wherein after said determining step, an ordinary color original is read by said color image reading unit and an output signal from said color image reading unit is corrected by said color correction unit and then said color image forming unit forms a reproduced image.

7. A method according to claim 5, wherein said determining step is a step in which said single set of color correction coefficients is obtained through a method of least squares including an operation for obtaining a difference between a color recorded by said recording unit and a color recorded by said reading unit.

8. A color image forming apparatus comprising:
   output means for forming a color image on a recording medium using a plurality of different coloring agents;
   means for generating a pattern signal corresponding to a predetermined color;
   memory means for storing a value corresponding to the pattern signal generated by said pattern signal generating means;
   conversion means for converting a pattern corresponding to the pattern signal from said generating means into a plurality of color component signals, wherein said pattern has been formed on said recording medium by said output means, and wherein said conversion means reads colors within a predetermined region, manually set, on said recording medium; and
   means for discriminating an output characteristic of said output means based on a signal value obtained by said conversion means corresponding to said pattern on said recording medium and said value in said memory means, and for displaying the result of said discrimination.

9. A color image forming apparatus according to claim 8, wherein the result of said discrimination is displayed independently for each color component signal.

10. A color image forming apparatus according to claim 8, wherein said conversion means includes an image scanner for scanning said recording medium on which said pattern has been formed by said output means.

11. A color image forming apparatus according to claim 8, wherein said pattern signal corresponds to a plurality of colors.

12. A method of setting color correction characteristic of a color reproduction system, comprising the steps of:

recording a color pattern including a plurality of predetermined colors by using a color image forming unit;

reading colors within a manually set region including said recorded color pattern by using a color image reading unit; and determining a color correction parameters from the color pattern read by said reading unit and the color pattern to be recorded by said image forming unit.

13. A method according to claim 12, wherein said color image forming unit includes an electronic photo-printer.

14. A method according to claim 12, wherein said reading unit includes color line image sensor.

15. A method according to claim 12, wherein said determining step is performed such that the color pattern read by said reading unit coincides with the color pattern to be recorded by said image forming unit.

* * * * *

UNITED STATES PATENT AND TRADEMARK OFFICE
CERTIFICATE OF CORRECTION

PATENT NO. : 5,142,356
DATED : August 25, 1992
INVENTOR(S) : AKIHIRO USAMI, ET AL.

It is certified that error appears in the above-identified patent and that said Letters Patent is hereby corrected as shown below:

COLUMN 1

Line 7, "continuation-in-part" should be deleted.

COLUMN 4

Line 21, "$Y(\lambda)=S(\lambda)\cdot F(\lambda)\cdot ro(\lambda)$" should read --$r(\lambda)=S(\lambda)\cdot F(\lambda)\cdot r_0(\lambda)$--.

Line 23, "$S(\lambda)=S(\lambda)\cdot F(\lambda)\cdot go(\lambda)$" should read --$g(\lambda)=S(\lambda)\cdot (F\lambda)\cdot g_0(\lambda)$--.

Line 25, "$b(\lambda)=S(\lambda)\cdot F(\lambda)\cdot bo(\lambda)$" should read --$b(\lambda)=S(\lambda)\cdot (F\lambda)\cdot b_0(\lambda)$--.

Line 32, "$\pi(\lambda) \times z(\lambda)$" should read --$\rho(\lambda) \times \bar{z}(\lambda)$--.

Line 42, "$\begin{bmatrix} \rho(\lambda)\cdot x(\lambda) \\ \rho(\lambda)\cdot y(\lambda) \\ \rho(\lambda)\cdot z(\lambda) \end{bmatrix}$" should read --$\begin{bmatrix} \rho(\lambda)\cdot \bar{x}(\lambda) \\ \rho(\lambda)\cdot \bar{y}(\lambda) \\ \rho(\lambda)\cdot \bar{z}(\lambda) \end{bmatrix}$--.

COLUMN 5

Line 32, "point." should read --points.--.

COLUMN 6

Line 50, "be" should be deleted.

COLUMN 8

Line 13, "designation a" should read --designation of a--.
Line 31, "plate" should read --plate.--.
Line 40, "determined" should read --are determined--.

UNITED STATES PATENT AND TRADEMARK OFFICE
CERTIFICATE OF CORRECTION

PATENT NO. : 5,142,356
DATED : August 25, 1992
INVENTOR(S) : AKIHIRO USAMI, ET AL.

It is certified that error appears in the above-identified patent and that said Letters Patent is hereby corrected as shown below:

COLUMN 9

Line 25, "equation stand" should read --equation is obtained--.
Line 58, "$a_{44}$ to $b_4$" should read --$a_{44}$ and $b_4$--.
Line 59, "G.  Where" should read --G, where--.

COLUMN 10

Line 22, "are" should read --is--.
Line 58, "Further" should read --Further,--.
Line 63, "is not needed" should read --does not need--.

COLUMN 16

Line 20, "suing" should read --using--.

COLUMN 18

Line 4, "a" should be deleted.

Signed and Sealed this

Twenty-first Day of December, 1993

Attest:

BRUCE LEHMAN

Attesting Officer

Commissioner of Patents and Trademarks